124,553

UNITED STATES PATENT OFFICE.

HORACE CUTLER, OF SPRINGFIELD, MASSACHUSETTS.

IMPROVEMENT IN ARTIFICIAL FUEL.

Specification forming part of Letters Patent No. 124,553, dated March 12, 1872; antedated March 8, 1872.

*To all whom it may concern:*

Be it known that I, HORACE CUTLER, of Springfield, in the county of Hampden and State of Massachusetts, have invented a new and useful Improved Artificial Fuel; and I do hereby declare that the following is a full, clear, and exact description thereof.

My invention relates to that class of artificial fuel which has for its base the dust and screenings of coal, either hard or soft, or both, properly mixed with some suitable substance which is combustible and which confines the coal-dust in a mass; and my invention consists in the admixture of the following articles with coal-dust or screenings, the following proportions producing the best result: About ninety pounds of coal-dust or coal-screenings to about three pounds of fresh-slaked lime, two pounds of calcined plaster, and one-half pound of sulphur.

I find by experiment that the best fuel is produced by first putting the lime, slaking, and, during the ebullition, mix in the sulphur with it. The coal-dust and plaster are then added, and the whole thoroughly mixed together, and it may then, while in a wet or plastic state, be placed in molds or forms and compressed into any form desired, and packed away for use.

In order to make the fuel somewhat impervious to water, if that should be desirable, during transportation, a small quantity of cement may be added—say one pound—to the above quantities of the other materials. The common fine coal-dust may, in this manner, be utilized, or the coarser grains of coal, known in commerce as "pea coal," and when mixed with the other ingredients mentioned, either will be available for fuel, and may be used with the same facility as the other larger qualities of coal.

This composition will burn so freely and readily that it may be used for fuel immediately after being mixed and pressed, or even before being pressed, although I prefer to press it into cakes, as it is then more convenient to handle.

Having thus described my invention, what I claim as new, and desire to secure by Letters Patent, is—

The composition for artificial fuel, substantially as herein described and set forth.

HORACE CUTLER.

Witnesses:
  T. A. CURTIS,
  CLARENCE E. BUCKLAND.